United States Patent [19]

Bezos

[11] Patent Number: 5,715,399
[45] Date of Patent: Feb. 3, 1998

[54] SECURE METHOD AND SYSTEM FOR COMMUNICATING A LIST OF CREDIT CARD NUMBERS OVER A NON-SECURE NETWORK

[75] Inventor: Jeffrey P. Bezos, Bellevue, Wash.

[73] Assignee: Amazon.Com, Inc., Seattle, Wash.

[21] Appl. No.: 453,273

[22] Filed: May 30, 1995

Related U.S. Application Data

[63] Continuation-in-part of Ser. No. 413,242, Mar. 30, 1995.
[51] Int. Cl.⁶ .............................. G06F 17/60; G06G 7/52
[52] U.S. Cl. .................... 395/227; 235/379; 235/380; 235/381; 395/239
[58] Field of Search ................................. 235/379, 380, 235/487, 381; 902/24; 364/401 R; 340/827, 825.33, 825.34, 825.35; 395/239, 240, 227

[56] References Cited

U.S. PATENT DOCUMENTS 5,336,870  8/1994  Huges et al. ............................ 235/379

OTHER PUBLICATIONS

Loshin, P., "Selling Online With . . . First Virtual", Chapters 3 and 4, Charles River Media, Inc., 1996.
Borenstein, N. "Perils and Pitfalls of Practical Internet Commerce (Part I)." <http://www.fv.com/company/first year1.html>, 1996.
Templeton, B., "USENIX–Race to Develop Internet Commerce," Newsbytes News Network, IAC Newsletter, Jan. 1995.
"Wells Fargo and CyberCash Team Up to Provide Secure Online Payment Systems," CyberCash News Release, Dec. 1994.
Somogyi, S., "How Would You Like to Pay for That? A Guide to Digital Cash and Carry Technology," Digital Media, v4, n7, p. 13, Dec. 1994.

*Primary Examiner*—Wellington Chin
*Assistant Examiner*—Melissa Kay Carman
*Attorney, Agent, or Firm*—Ronald M. Anderson

[57] ABSTRACT

A method and system for securely indicating to a customer one or more credit card numbers that a merchant has on file for the customer when communicating with the customer over a non-secure network. The merchant sends a message to the customer that contains only a portion of each of the credit card numbers that are on file with the merchant. The message may also contain a notation explaining which portion of each of the credit card numbers has been extracted. A computer (38) retrieves the credit card numbers on file for the customer in a database (40), constructs the message, and transits the message to a customer location (10) over the Internet network (30) or other non-secure network. The customer can then confirm in a return message that a specific one of the credit card numbers on file with the merchant should be used in charging a transaction. Since only a portion of the credit card number(s) are included in any message transmitted, a third party cannot discover the customer's complete credit card number(s).

20 Claims, 3 Drawing Sheets

TO: JOHN@CUSTOMER.COM
FROM: MAILBOT@MERCHANT.COM
SUBJECT: CREDIT CARD SELECTION;
      ORDER MESSAGE ID (MID) MID-JOHN-7452

---

[ORDER SPECIFIC INFORMATION WOULD BE INCLUDED IN THE FIRST PARAGRAPH.]

WE ALREADY HAVE YOUR SHIPPING ADDRESS AND CREDIT CARD INFORMATION ON FILE. PLEASE CONFIRM IN A REPLY MESSAGE THAT THE INFORMATION LISTED BELOW IS CORRECT BY INCLUDING THE WORDS "AS USUAL" AS THE FIRST TWO WORDS IN THE BODY OF THE MESSAGE OR, PROVIDE ANY CORRECTIONS TO THE INFORMATION.

YOUR SHIPPING ADDRESS WILL BE:
    JOHN W. CUSTOMER
    123 ANYSTREET
    ANYCITY, AS 12345

WE HAVE THE FOLLOWING CREDIT CARD NUMBERS ON FILE FOR YOU (ONLY THE LAST FIVE DIGITS ARE SHOWN FOR SECURITY REASONS). PLEASE INDICATE THE CREDIT CARD NUMBER THAT SHOULD BE USED TO PAY FOR THIS ORDER BY INCLUDING THE REFERENCE LETTER OF THAT CREDIT CARD, WHICH IS USED BELOW, IN YOUR REPLY MESSAGE.

| REF. LETTER | TYPE | LAST 5 DIGITS | EXP. DATE |
|---|---|---|---|
| A. | VISA | 86543 | 10/98 |
| B. | VISA | 21883 | 04/97 |
| C. | MC | 15609 | 08/98 |

*FIG. 2*

SECURE METHOD AND SYSTEM FOR COMMUNICATING A LIST OF CREDIT CARD NUMBERS OVER A NON-SECURE NETWORK

RELATED APPLICATIONS

This application is a continuation-in-part of prior copending application Ser. No. 08/413,242, filed Mar. 30, 1995, the benefit of the filing date of which is hereby claimed under 35 U.S.C. § 120.

FIELD OF THE INVENTION

The present invention generally relates to a method and system for communicating confidential information over a non-secure network, and more specifically, for communicating credit card data over the non-secure network.

BACKGROUND OF THE INVENTION

Catalog shopping represents an increasing part of the economy. The growth in its popularity can in part be explained because consumers have learned that goods purchased from a catalog are often much less expensive than if purchased through a normal retail store. In addition, because a customer can shop without leaving the comfort of home or office, placing an order for merchandise from a catalog makes much more efficient use of the customer's time.

Shopping for goods and services using a personal computer to place an order on a network is a natural extension to the more traditional catalog shopping, since the customer enjoys these same benefits. The COMPUSERVE™ network and other private networks have long offered members the opportunity to browse through on-line "Electronic Shopping Malls" and place orders for goods shown and described therein. New opportunities for shopping via personal computers arise daily as more people gain access to the Internet network, with its interconnectivity and easy access to locations throughout the world via the World Wide Web or E-mail.

A credit card facilitates making purchases via telephone or over the network. However, users are justifiably concerned about their credit card numbers being transmitted over networks such as the Internet, for example, via E-mail, because of the lack of secure communications.

Security on public networks at the present time is virtually non-existent, making it relatively easy for an unauthorized third party to gain access to credit card data transmitted over the network. Once a dishonest person has another person's credit card number, thousands of dollars can be improperly charged to that credit card account.

Currently, most transactions occurring over networks such as the Internet are done in two parts. The majority of the order information, such as customer name and shipping address, is transmitted over the network. In the second step, the customer places a telephone call to the merchant to provide credit card information for billing purposes. Alternatively, the customer may fax the credit card information to the merchant.

Regardless of the method used by the customer to convey the credit card information to the merchant, after the information has once been conveyed, it can remain "on file" with the merchant in a customer database. For subsequent purchases, the customer need not communicate a credit card number to the merchant. The customer need only provide his or her name to the merchant, and so long as the shipping address provided by the customer matches that on file, the merchant will use the credit card number the customer previously gave to the merchant to charge the order placed. If the shipping address is different than that on file with the merchant, the transaction can still be completed if the customer confirms his or her identity, possibly by providing an account ID and/or password established at the time the credit card number was initially conveyed.

Leaving a credit card number on file with the merchant is advantageous to the customer, because it eliminates the need to communicate the credit card information when making subsequent purchases. Providing the credit card information each time that a purchase is made is inconvenient to a customer. Furthermore, each time that the credit card information is communicated to a merchant, another opportunity is presented for an unauthorized third party to gain access to the credit card data.

Credit cards are so convenient to use and easy to obtain that most people have several general purpose credit cards of different types. As a result, a problem can arise when placing orders with a merchant that maintains credit card information from previous orders for each customer. Since a substantial period of time may elapse between orders placed with a particular merchant, it is possible that the customer may forget which credit card number (or numbers) were left on file with a merchant. The specific credit card number on file with the merchant may be important to the customer for any number of reasons, including the possibility that the credit card to which the merchant may charge the transaction is at its credit limit and should therefore not be charged for the current purchase.

As noted above, it is also possible that the customer may have more than one credit card number on file with the merchant and may prefer to charge the current transaction to a specific credit card account. If the customer is to choose between multiple credit card numbers on file with the merchant, it would be advantageous if the merchant could present to the customer, at the time the order is placed, a list of the credit card numbers the merchant has on file for that customer.

The merchant could send the list of credit card numbers on file to the customer over the Internet or other non-secure network, by straightforward means, such as by displaying to the customer a World Wide Web page containing the credit card numbers or by sending an E-mail message containing the credit card numbers to the customer. However, sending the credit card numbers in this manner would jeopardize the security of the numbers, possibly placing the customer at risk.

Alternatively, the credit card numbers could be encrypted at the merchant's location using any of several techniques (including public key encryption) before being transmitted to the customer location, where they would be unencrypted and then viewed by the customer. However, applying encryption techniques when transmitting a list of credit card numbers requires that the customer have access to the proper decryption software. The widespread dissemination of such software will likely not occur for some time.

A new method for a merchant to convey a list of credit card numbers on file for a customer to the customer over a non-secure network is needed that does not jeopardize the security of the customer's credit card information. The present invention provides a solution to this problem that is relatively efficient and foolproof.

SUMMARY OF THE INVENTION

In accordance with the present invention, a method is defined for enabling a merchant to indicate to a customer, by a communication over a non-secure network, the customer's credit card number that will be charged for a transaction; the indication occurs without risk that a third party will discover the customer's credit card number. The credit card number is maintained in a database by the merchant. As used throughout this specification and in the claims that follow, the term "credit card" is intended to encompass debit cards and any other form of credit or debit used to make a purchase by providing a reference number that uniquely identifies a purchaser's account from which funds to pay a seller for goods or services will be transferred. The method includes the step of retrieving the credit card number of the customer from the database. A portion of the credit card number that is substantially smaller than the complete credit card number is then extracted from the credit card number retrieved. Next, a message containing the portion of the credit card number is constructed and the message is transmitted to the customer over the non-secure network.

The message also preferably includes a notation indicating the portion of the credit card number that has been included in the message. Also, in the preferred embodiment, the portion comprises the last N digits of the credit card number, where N is an integer. In the preferred embodiment, the message may comprise either an E-mail message addressed to the customer or a World Wide Web page.

In addition, the method also deals with the condition where the merchant maintains a plurality of credit card numbers of the customer in the database. In this case, each of the plurality of the credit card numbers of the customer that are in the database are retrieved and portions of each of the plurality of credit card numbers of the customer are extracted. The message is constructed so that it contains the portions of each of the plurality of the credit card numbers of the customer.

If the portions of the plurality of the credit card numbers of the customer do not all differ from each other, the size of the portion of each of said plurality of the credit card numbers extracted is successively increased (up to some predefined limit) to form a larger portion, until the larger portions of the credit card numbers all differ from each other. Then, the message is constructed to include the larger portions of the plurality of the credit card numbers. In addition, the method preferably further comprises the step of indicating in the message to the customer a credit card expiration date associated with each of the portions of the credit card numbers listed. The portions of two credit card numbers then differ from each other if the credit card expiration dates associated with the portions of the two credit card numbers are different, even though the portions of the two credit card numbers are numerically equal. Similarly, the message can indicate a credit card expiration date associated with each of the portions of the credit card numbers listed. Then, the portions of two credit card numbers will be found to differ from each other if the credit card expiration dates associated with the portions of the two credit card numbers are different, even though the portions of the two credit card numbers are numerically equal.

When the database includes multiple credit cards for the customer, the customer is requested to indicate a specific one of the plurality of the credit card numbers of the customer that should be used in a transaction with the merchant. This response can be provided to the merchant in a return message from the customer to the merchant.

Another aspect of the present invention is directed to a system for constructing and transmitting a message from a merchant to a customer using a non-secure transmission method. The message indicates a credit card number (or numbers) of the customer that is maintained by the merchant in a database. The system includes a computer for use in constructing and transmitting the messages, and the computer has a central processor that executes instructions. A memory in the computer stores the instructions to be executed, and non-volatile storage stores the database and the messages. The instructions stored in the memory of the computer cause the central processor to perform functions that are generally consistent with the steps of the method described above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein:

FIG. 2 illustrates an exemplary E-mail message transmitted from a merchant to a customer that includes portions of credit card numbers indicating the credit card information that the merchant is maintaining for the customer;

DESCRIPTION OF THE PREFERRED EMBODIMENT

Figure 1:
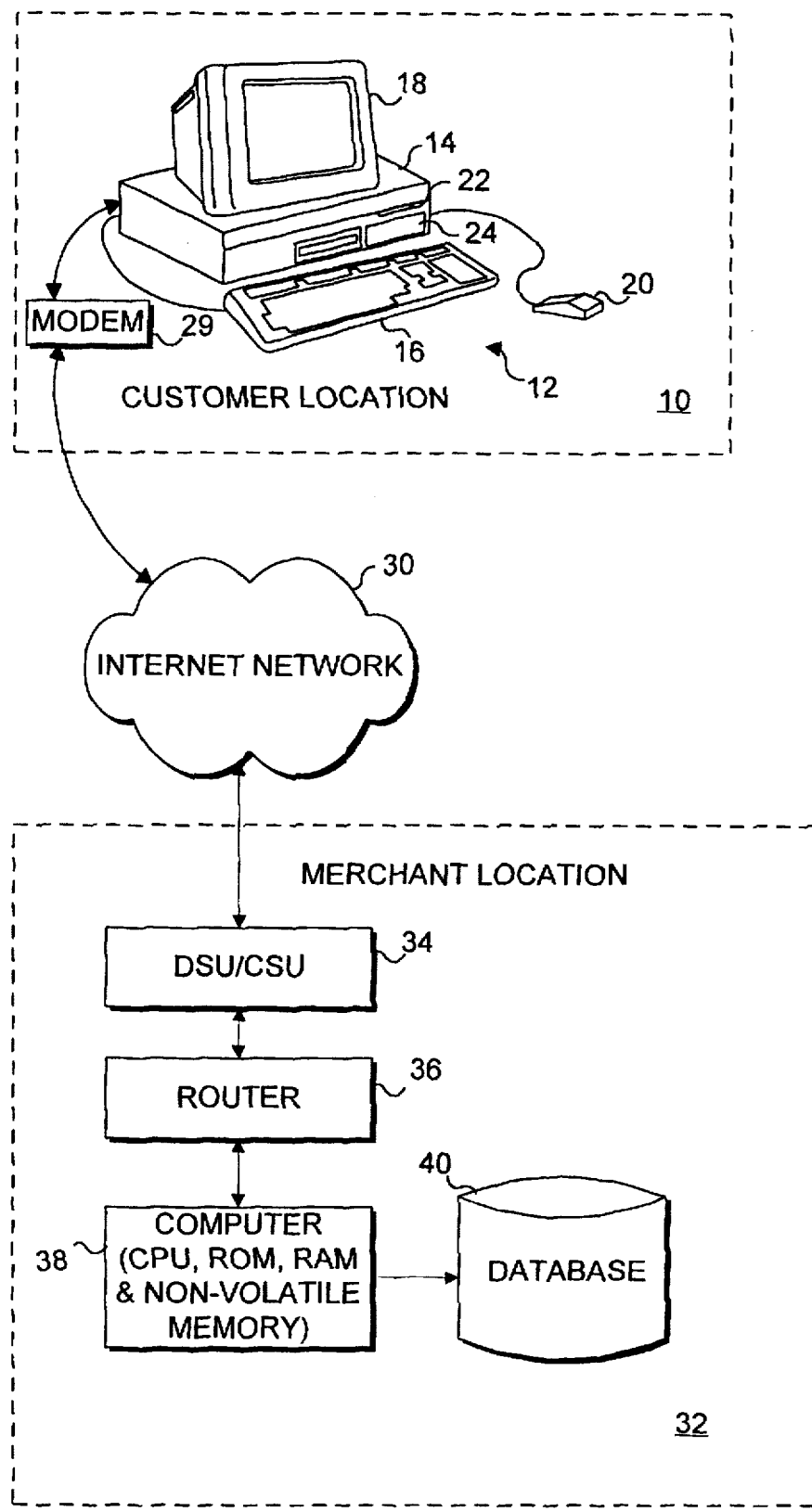
FIG. 1 is a block diagram illustrating the components involved in the communication between a merchant location and a customer location, over a non-secure network, in accord with the present invention.

With reference to FIG. 1, the principal components used to implement the present invention are illustrated in a block diagram. At the top of the Figure, a dash line defines a customer location 10, which in many cases will be the customer's home or place of business. At customer location 10, a personal computer 12 is employed to receive and transmit E-mail or to receive and transmit data over the World Wide Web or to receive and transmit messages by some other means. Personal computer 12 is generally conventional in design, comprising a processor chassis 14 within which are disposed a central processing unit (CPU) and supporting integrated circuitry. Coupled to processor chassis 14 is a keyboard 16 and a monitor 18. Personal computer 12 is controlled by the customer using keyboard 16 and a mouse 20 (optional) or other pointing device that controls a cursor that is moved about on the screen of the monitor to make selections in programs executing on the personal computer. In the front panel of the processor chassis are mounted a floppy drive 22 and a hard drive 24.

Although a desktop type of personal computer is illustrated in FIG. 1, it will be understood that a laptop or other, type of portable computer, a "dumb" terminal, or a personal digital assistant can also be used in connection with the present invention, for receiving and transmitting messages over a non-secure network. In addition, a workstation on a local area network at the customer location can be used instead of personal computer 12 for receiving and transmitting messages over the non-secure network. Accordingly, it should be apparent that the details of personal computer 12 are not particularly relevant to the present invention. Personal computer 12 simply serves as a convenient interface for receiving and transmitting messages over the non-secure network.

While the present invention is applicable to private networks such as COMPUSERVE™, PRODIGY™, and AMERICA ONLINE™, in FIG. 1, personal computer 12 is shown connected to an Internet network 30. The connection between personal computer 12 and the Internet can be through a modem and telephone line via a private network service provider that is directly connected to the Internet network, through an Internet service provider that is directly connected, or via a direct high-speed data connection. The details of the type of connection to the Internet (or other) network are of no consequence in the present invention.

Internet network 30 is depicted in FIG. 1 as an amorphous shape to indicate that it is a complex system, which can involve many thousands of nodes and components, conveying signals by land lines, satellite, and/or optical fibers. The details of the Internet network are, however, not important in the present invention.

The present invention is likely to find application when a customer is placing or has placed an order with an on-line merchant for a service or merchandise via the Internet (or other non-secure network). The present, invention is applicable in those cases where the customer has previously placed one or more orders with the merchant and has provided the merchant with one or more credit card numbers, which the merchant has maintained in a customer file. To complete a current transaction with the customer, the merchant will need for the customer to confirm that a credit card previously provided should be charged for the transaction. If more than one credit card number appears in the file for the customer, it will also be necessary for the customer to indicate the specific credit card number that should be charged. When a merchant needs to transmit information indicating the credit card numbers that a customer has on file with the merchant, a message containing this information can be transmitted over the Internet network from a merchant location 32 to the appropriate customer location 10, using the present invention, without compromising the confidentiality and security of the customer's credit card number(s).

In FIG. 1, merchant location 32 is indicated by a dash line surrounding the components, including a computer 38, that the merchant uses to communicate with customers through messages conveyed over the Internet. Preferably, computer 38 comprises a SUN SPARC5™ minicomputer, which includes a CPU, RAM, ROM, and a non-volatile storage device (a high-speed hard drive—not separately shown) for use in storing a database 40. Computer 38 is coupled to a router 36, such as a Livingston PORTMASTER™, which is connected to a digital service unit/customer service unit (DSU/CSU) 34, such as an ADC KENTROX D-SERV™. The DSU/CSU is connected to high-speed data lines that access Internet network 30. In the memory of computer 38 are stored application programs that execute on the CPU. Among these programs, for use in the present invention, are an ORACLE™ database management system and custom software. The programs or software comprise machine instructions that instruct the CPU within computer 38 to implement the steps of the present invention, generally as explained below.

Credit card numbers for customers are stored in database 40 by the merchant. Each credit card number is associated with one of the customers who has previously transacted business with the merchant and with other data for the customers, such as names, addresses, and telephone numbers.

As discussed above in the Background of the Invention, public networks such as Internet network 30 are notoriously lacking in security for transmission of sensitive and confidential data, such as credit card numbers. Sending a message containing a complete credit card number from merchant location 32 to customer location 10 over Internet network 30 would jeopardize the security of the credit card number. However, a merchant can safely employ the present invention to convey a message to a customer indicating the credit card number(s) that the customer has on file with the merchant; the message can be conveyed over the Internet network from merchant location 32 to customer location 10, without risk that the customer's credit card number(s) might be discovered by a third party.

An exemplary E-mail message 50 that indicates a customer's credit card numbers on file by a merchant is shown in FIG. 2. A message heading 56 includes an E-mail address, indicates the merchant who is sending the message, provides an order message ID (MID) number that identifies the current transaction to be charged to the customer's credit card account, and notes that the subject of the message is credit card selection.

In the body of the message, an explanation is provided that indicates the response required of the customer. Although not shown in this exemplary message, the merchant may also include language in the message soliciting the customer to make a particular or additional purchases. More importantly, the customer is asked to reply to the E-mail message by confirming or correcting a customer address 58 and indicating a specific one of the credit card numbers in a list 52 that is to be charged for the current transaction. If a customer has only a single credit card number on file with the merchant, the message will ask the customer to confirm that the credit card number on file should be charged for the current transaction.

The message sent by the merchant indicates only a portion of each of the credit card numbers that the customer has on file with the merchant. In this example, a heading 54 notes that ONLY the last five digits of the entire twelve to sixteen digits in the typical credit card number are included in the message, in list 52. Although in this example, the last five digits of the complete credit card number are displayed in the message, it will be appreciated that either fewer or more than five digits of the credit card number can instead be displayed in list 52.

Alternatively, the message might display the first n digits of the credit card numbers; however, this alternative is less likely, because the first few digits are the same for a large number of credit cards. This detail is relatively unimportant, so long as the message displays only a relatively small subset of the entire credit card number.

Figure 3:
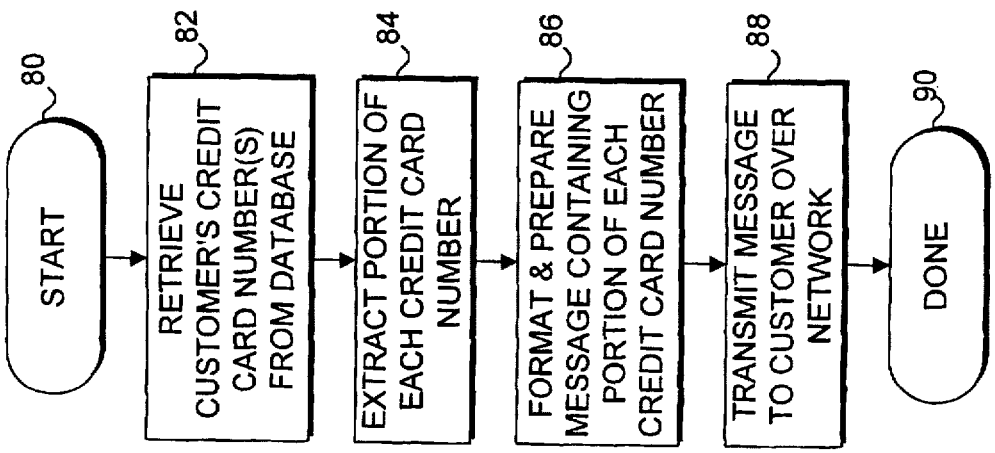
FIG. 3 is a flow chart showing the steps for conveying to a customer an indication of the customer's credit card numbers that are on file by the merchant, in accord with the present invention.

Further details of the process for indicating to the customer the credit card numbers that the customer has on file with the merchant are illustrated in the flow chart shown in FIG. 3, beginning at a start block 80. In a block 82, computer 38 retrieves from database 40 all of the credit card numbers on file for a specific customer, who is at customer location 10. In a block 84, computer 38 extracts a portion of each of the credit card numbers retrieved in block 82. In a block 86, computer 38 constructs a message (E-mail, World Wide Web page, or other type of message) containing the portion(s) of the credit card number(s) extracted in block 84. In a block 88, computer 38 transmits the message prepared in block 86 from merchant location 32 to customer location 10 over Internet network 30. In a block 90, the process is concluded.

Figure 4:
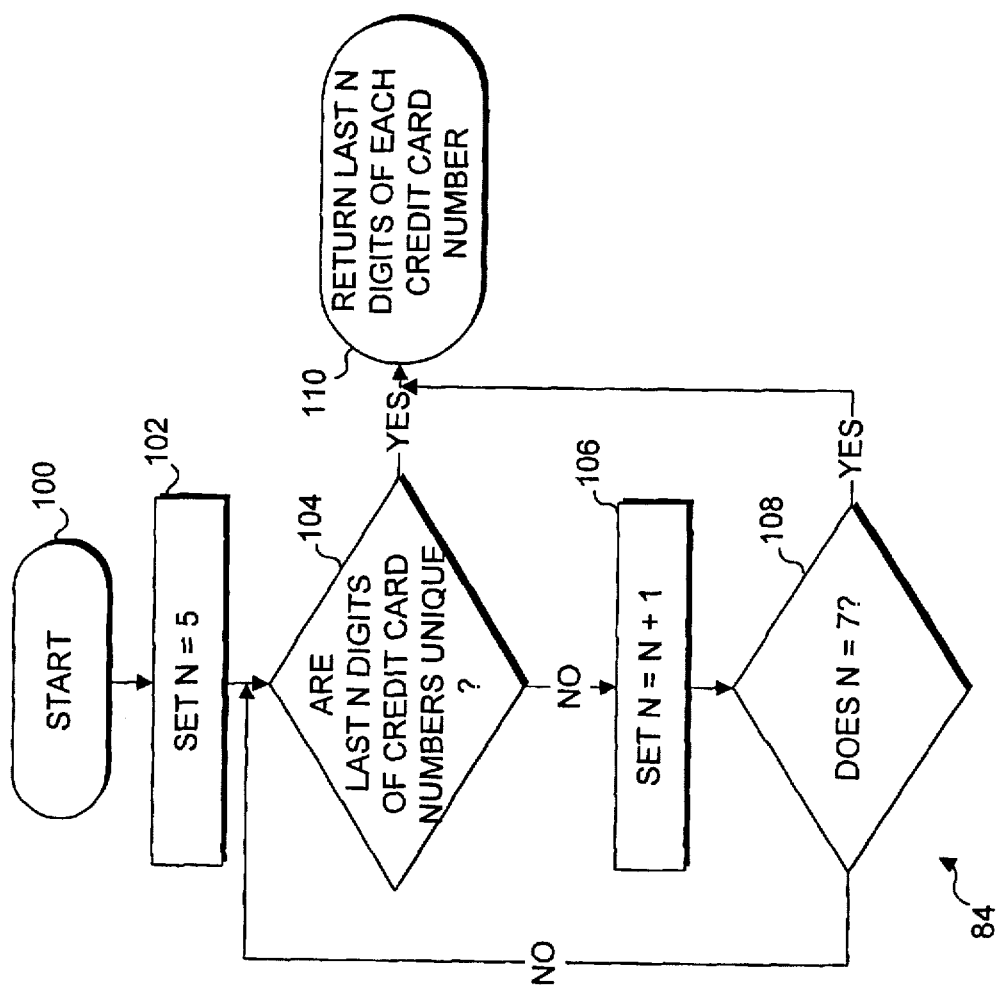
FIG. 4 is a flow chart illustrating the steps implemented when extracting a portion of each of the credit card numbers for inclusion in a message transmitted to the customer by the merchant.

In the preferred embodiment, the step of extracting a portion of each credit card number, which is referenced in block 84, is described in detail in FIG. 4, beginning at a start block 100. In a block 102, a variable N is set equal to 5. In a decision block 104, the numbers represented by the last N digits of each credit card number are examined for uniqueness. (The last N digits of a credit card number referred to as a "tail" in the following discussion.) If the tails of the customer's credit card numbers are all different or unique within the set of tails, the extraction process concludes in a block 110, by returning the last N digits or tail of each credit card number. If the tails of all of the customer's credit card numbers are not unique within the set, the value of N is incremented by 1 in a block 106. Although not specifically indicated within the flow chart, uniqueness of a tail also depends upon the type of credit card, and may depend upon other data on the credit card, such as the expiration date. Thus, a customer's VISA™ credit card expiring on 5/97 would be uniquely identified relative the customer's DISCOVER™ credit card expiring on 8/96, even though both cards were indicated by the same last N digits or tails, because the two credit cards are of different type and/or have different expiration dates.

In a decision block 108, the variable N is examined to determine if it is equal 7. If so, the extraction process again concludes in block 110, by returning the last N digits as the tails of the customer's credit card numbers. Returning to decision block 108, if N does not equal 7, processing loops back to decision block 104, where the N digits comprising the tails of the customer's credit card numbers are again examined for uniqueness within the set. Regardless of the path taken, the logic eventually reaches block 110, from which point processing continues with block 86 in FIG. 3.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method enabling a merchant to indicate to a customer by a communication over a non-secure network, a credit card number of the customer that is maintained in a database by the merchant, said method comprising the steps of:
   (a) retrieving the credit card number of the customer from the database;
   (b) extracting a portion of the credit card number, said portion being substantially smaller than the complete credit card number;
   (c) constructing a message containing the portion of the credit card number; and
   (d) transmitting the message to the customer over the non-secure network.

2. The method of claim 1, wherein the message also includes a notation indicating the portion of the credit card number that has been included in the message.

3. The method of claim 1, wherein the portion comprises the last N digits of the credit card number, where N is an integer.

4. The method of claim 1, wherein the message comprises an E-mail message addressed to the customer.

5. The method of claim 1, wherein the message comprises a World Wide Web page.

6. The method of claim 1, wherein the merchant maintains a plurality of credit card numbers of the customer in the database, further comprising the steps of repeating steps (a) and (b) for each of the plurality of the credit card numbers of the customer that are in the database to obtain portions of each of the plurality of credit card numbers of the customer; and constructing the message so that the message contains the portions of each of the plurality of the credit card numbers of the customer.

7. The method of claim 6, further comprising the steps of determining if the portions of the plurality of the credit card numbers of the customer all differ from each other, and if not, successively increasing a size of the portion of each of said plurality of the credit card numbers extracted to form a larger portion, until said larger portions all differ from each other; and then constructing the message to include the larger portions of said plurality of the credit card numbers.

8. The method of claim 7, further comprising the step of indicating in the message a type of credit card for each of the portions of the credit card numbers listed, wherein the portions of two credit card numbers differ from each other f the portions of said two credit card numbers are from different types of credit cards, even though the portions of said two credit card numbers are numerically equal.

9. The method of claim 7, further comprising the step of indicating in the message a credit card expiration date associated with each of the portions of the credit card numbers listed, wherein the portions of two credit card numbers differ from each other if the credit card expiration dates associated with the portions of said two credit card numbers are different, even though the portions of said two credit card numbers are numerically equal.

10. The method of claim 7, further comprising the step of requesting the customer to indicate a specific one of the plurality of the credit card numbers of the customer that should be used in a transaction with the merchant in a return message.

11. A system for constructing and transmitting a message from a merchant to a customer using a non-secure transmission method, said message indicating a credit card number of the customer that is maintained by the merchant in a database, comprising:
   (a) a computer for use in constructing and transmitting said messages, said computer having a central processor that executes instructions, a memory for storing the instructions to be executed, and non-volatile storage for storing the database and the messages; and
   (b) said instructions stored in the memory of the computer causing the central processor to:
      (i) retrieve the credit card number of the customer from the database stored in the non-volatile storage;
      (ii) extract a portion of said credit card number, said portion being substantially smaller than the complete credit card number;
      (iii) construct a message including the portion of the credit card number; and
      (iv) transmit the message to the customer using the nonsecure transmission method.

12. The system of claim 11, wherein the instructions cause the central processor to include in the message a notation indicating the portion of the credit card number that has been included in the message.

13. The system of claim 11, wherein the instructions cause the central processor to extract the last N digits of the credit card number for use as said portion, where N is an integer.

14. The system of claim 11, wherein the instructions cause the central processor to construct the message as an E-mail message.

15. The system of claim 11, wherein the instructions cause the central processor to construct the message as a World Wide Web page.

16. The system of claim 11, wherein the merchant maintains a plurality of credit card numbers for the customer in the database, and wherein the instructions cause the central processor to:

(a) retrieve all of said plurality of the credit card numbers from the database;

(b) extract portions of the plurality of the credit card numbers; and (c) construct the message so that the message includes said portions of said plurality of credit card numbers.

17. The system of claim 16, wherein the instructions further cause the central processor to:

determine if the portions of the plurality of the credit card numbers of the customer that are extracted all differ from each other, and if not:

(a) successively increase a size of said portions to form larger portions of said plurality of credit card numbers until said larger portions all differ from each other; and (b) construct the message so that the message includes the larger portions.

18. The system of claim 17, wherein the instructions cause the central processor to indicate in the message a type of credit card associated with each portion of the credit card numbers listed; and to determine that the portions of the credit card numbers differ from each other if the portions of said two credit card numbers are for different types of credit cards, although the portions of said two credit card numbers are numerically equal.

19. The system of claim 17, wherein the instructions cause the central processor to indicate in the message a credit expiration date associated with each of the portions of the credit card numbers listed; and to determine that the portions of two credit card numbers differ from each other if the portions of said two credit card numbers are associated with different credit card expiration dates, although the portions of said two credit card numbers are numerically equal.

20. The system of claim 11, wherein the instructions cause the central processor to construct the message to include a request that the customer indicate a specific one of the plurality of the credit card numbers of the customer that should be used in a transaction with the merchant, in a return message.

* * * * *

UNITED STATES PATENT AND TRADEMARK OFFICE
CERTIFICATE OF CORRECTION

PATENT NO. : 5,715,399

DATED : February 3, 1998

INVENTOR(S) : Jeffrey P. Bezos

It is certified that error appears in the above-indentified patent and that said Letters Patent is hereby corrected as shown below:

On the Title page, item [57]:

| | |
|---|---|
| In the Abstract: | "transits" should read --transmits-- |
| Column 4, Line 61 | "other," should read --other-- |
| Column 5, Line 27 | "present," should read --present-- |
| Column 6, Line 33 | "E-mall" should read --E-mail-- |
| Column 7, Line 14 | "tall" should read --tail-- |
| Column 7, Line 18 | "tall" should read --tail-- |
| Column 7, Line 45 | "fight" should read --right-- |
| Column 7, Line 55 (Claim 1) | "number;," should read --number;-- |
| Column 8, Line 24 (Claim 8) | "f" should read --if-- |

Signed and Sealed this

Seventh Day of July, 1998

Attest:

BRUCE LEHMAN

*Attesting Officer*     *Commissioner of Patents and Trademarks*